Aug. 7, 1956    T. W. NEWELL    2,757,969
OIL SPRAYING VALVE
Filed Oct. 20, 1953

T. W. Newell
INVENTOR

BY *Cl. Snow + Co.*
ATTORNEYS.

United States Patent Office 2,757,969
Patented Aug. 7, 1956

2,757,969
OIL SPRAYING VALVE

Theodore W. Newell, Sacramento, Calif.

Application October 20, 1953, Serial No. 387,162

1 Claim. (Cl. 299—144)

This invention relates to a valve for spreading oil from a source of oil supply onto a surface with which the oil is to be used.

It is a principal object of this invention to provide a valve of the kind to be more particularly described hereinafter for spraying or spreading oil from an oil tank on a truck or the like onto the surface of a road covered with asphalt, road oil or any equivalent bituminous material used as a finished road surface in present day roads.

It is another object of this invention to provide a valve of this kind to be applied on the spreader bar of an oil truck used for spreading oil onto the surface of a road. The valve is provided with a rotatable plug for controlling the flow of oil from the oil tank through the valve and with orifices through which the oil may be discharged from the valve.

It is a further object of this invention to provide a valve of this kind to be mounted on an oil spreading truck having a fixed spreader bar for controlling the discharge of oil from the spreader bar.

It is a still further object of this invention to provide a valve of this kind in which the flow of oil through the valve may be adjusted and remain in the adjusted position throughout the movement of the oil truck with the fixed spreader bar over a length of road.

It is yet another object of this invention to provide a valve of this kind which may be easily and readily applied on the fixed spreader bar of an oil truck and equally easily removed for cleaning when and as the occasion may arise.

Other and further objects and advantages of the invention will be hereinafter described and the novel features thereof defined in the appended claim.

Figure 1:
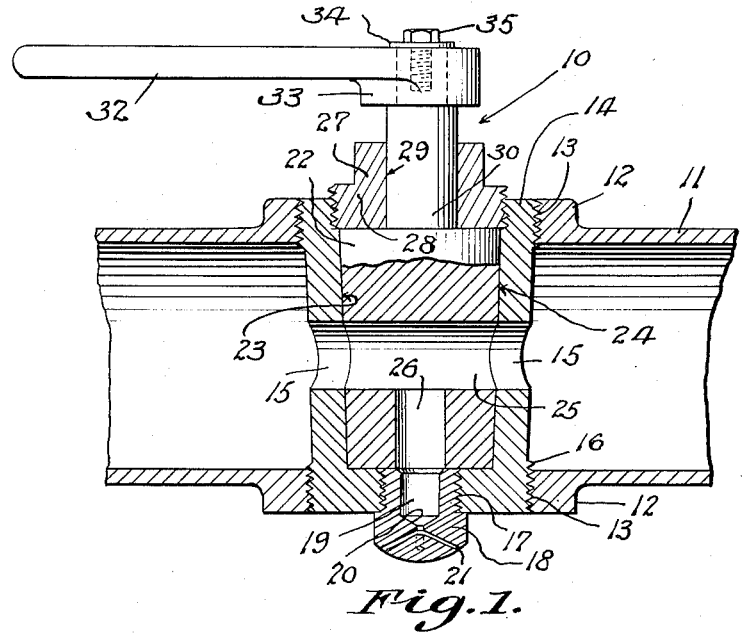
Fig. 1 is a longitudinal section through a valve constructed according to an embodiment of my invention mounted in a spreader bar.
Figure 2:
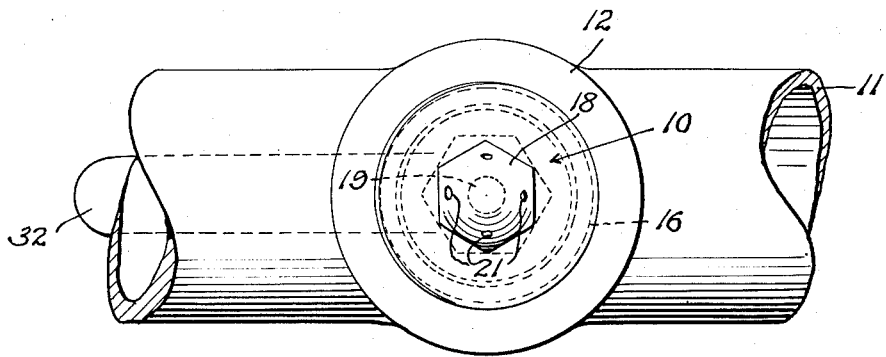
Fig. 2 is a bottom plan view of the valve mounted on the spreader bar, the spreader bar being partially broken away.

Referring to the drawings, the numeral 10 designates generally a valve of the kind to be more particularly described hereinafter for use in spreading oil or some other liquid oily substance onto the surface of a road which is adapted for absorbing the oil in the proper surfacing and further preparation of the surface of the road. The oiling and surfacing of the oil surfaced roads is commonly accomplished today by spreading oil in a thin film onto the upper surface of the road surface by way of a truck or the like wherein the oil is conveyed from an oil tank on the truck through a tubular spreader bar carried by the truck and spreading laterally from the truck over the upper surface of the road. The valve 10 is particularly adapted for connection intermediate the length of a tubular spreader bar 11 carried by the truck, the truck not shown in the drawings, and the valve 10 is adapted particularly to be disposed transversely of the spreader bar 11 or tube. In most instances of the use of a tubular spreader bar, the spreader bar is fixed at one end to the truck and extends laterally outwardly therefrom to provide a fixed tube on the truck extending from the oil tank, not shown in the drawings, through which the oil to be spread may be easily passed.

The tubular spreader bar or tube 11 is provided with openings on the opposite sides thereof having a boss 12 formed preferably integral with the tube with transversely aligned threaded openings 13 carried by the bosses within which the valve 10 may be threadedly engaged to be removable when and as desired.

The valve 10 includes a valve cage 14 which is threadably mounted between the bosses 12 and is threadably engaged within the openings of each of the bosses whereby the valve 10 may be removed from or inserted into the tubular spreader bar 11 when and as desired.

The valve cage 14 is provided with transversely aligned openings 15 in the opposite side walls thereof for the purposes to be described hereinafter and both of the ends of the valve cage 14 are threaded as indicated by the numeral 16 for threaded engagement within the openings 13 of the bosses to secure the valve cage 14 in its proper place transversely of the tube 11.

The valve cage 14 is open at the opposite ends thereof somewhat in the manner of a tube and the lower open end of the valve cage 14 is provided with a wall having a central threaded opening therein. The opening 17 is threaded interiorly thereof within which a discharge plug or nozzle 18, threaded exteriorly thereof, is threadedly engaged and the discharge plug 18 is opened throughout the length thereof for the passage of oil from the tube 11 downwardly and outwardly onto the surface of the road over which the truck is being moved.

A recess 19 is provided in the upper longitudinal end of the discharge plug 18 for opening longitudinally of the valve cage and the bottom of the recess 19 is inclined downwardly and inwardly from the outer edges thereof as indicated by the numeral 20 in the drawings. Downwardly and outwardly inclined apertures 21 are formed within the lower end of the discharge plug 18 and open downwardly from the plug and at their upper end through the inclined bottom wall 20 into the recess 19 so that the oil within the valve cage 14 may pass freely through the recess 19 and downwardly and outwardly through the inclined apertures 21.

A valve plug 22 is rotatably mounted within the valve cage 14 for controlling the flow of oil from the oil tubes or spreader bars 11 downwardly through the valve 10.

The valve plug 22 is formed with frusto-conical walls 23 on the outer surface thereof for rotatable engagement within the frusto-conical walls 24 of the valve cage much in the manner of a conventional type of plug valve.

The valve plug 22 is provided with a transverse bore 25 extending transversely thereof with the open end of the transverse bore 25 capable of being registered upon rotation of the plug 22 in communication with the transverse openings 15 of the valve cage 14 as clearly noted in the drawings.

A passage 26 is formed in the valve plug 22 extending longitudinally thereof and opening in communication with the bore 25, intermediate the length thereof, and opening at the other end in communication with the recess 19 in the discharge plug 18 so that oil may freely pass from the tube 11 through the opening 15, the bore 25, the passage 26 and recess 19 downwardly and outwardly through the apertures 21.

A cap 27 is threadably mounted in the cage 14, at the upper end thereof, the cage 14 being provided with internal threads for threadedly receiving the external threads of the lower enlarged end of the cap 27 when the valve 10 is being assembled. The threaded lower end of the cap 27 is designated by the numeral 28 in the drawings and is substantially larger than the upper end of the cap 27 as the upper end of the cap 27 is used more as a nut and for engagement with a wrench to rotate the cap 27 downwardly within the valve cage 14.

The cap 27 is provided with a centrally disposed longitudinally upwardly opening 29 within which the shank 30, to be more particularly described hereinafter, may be slidably and rotatably secured. The lower end of the shank 30 is fixed to the upper end of the valve plug 22 so that upon rotation of the shank 30 the valve plug 22 will be caused to rotate within the valve cage 14 to thereby control the flow of oil from the tube 11 downwardly and outwardly through the discharge plug 18.

In the use and operation of the valve 10, the valve cage 14 is initially threaded into the bosses 12 of the tube 11 and the discharge plug 18 is then threaded into the threaded opening 17 in the bottom of the valve cage. The valve plug 22 is then slid longitudinally of the valve cage 14 into place before the cap 27 is slid along the length of the shank 30 and threaded into place in the boss 12 at the upper end of the valve and pipe arrangement.

The cap 27 is provided with a plurality of polygonal nut faces on the upper end of the cap for engagement with the jaws of a wrench or other suitable means for rotating the cap 27 into the valve cage and into bearing engagement with the upper end of the valve plug 22.

A horizontally extending handle 22 is carried by the upper end of the shank 30, exteriorly of the valve 10, to control the opening and closing, or any intermediate positioning of the valve plug 22 within the valve cage 14.

The handle 32 is provided with a hub 33 at one end thereof which is slidably engageable over the reduced upper end of the shank 30 where it is secured in its proper place. A washer 34 overlies the upper surface of the hub 33 and a screw 35 engages through the washer 34 and into the upper end of the shank 30 for fixedly securing the handle 32 in its proper place so that upon rotation of the handle the shank 30 and the valve plug 22 will be caused to rotate for displacing the opposite ends of the bore 25 of the valve plug 22 in their relation to the registering openings in the valve cage 14.

In the use and operation of the valve 10, the valve may be assembled onto the tubular spreader bar 11 in the manner described above; and when oil is introduced along the length of the spreader bar 11 and the handle 32 is moved to its full open position, the oil will be free to pass through the valve cage and valve plug down through the discharge plug and on to the surface over which the oil tank is being traversed.

While the specific details of one embodiment of this invention have been herein shown and described, the invention is not confined thereto as changes and alterations may be made without departing from the spirit and scope thereof as defined in the appended claim.

I claim:

A liquid spray valve for mounting transversely across a pipe, comprising a substantially cylindrical cage having a pair of aligned openings, exterior threads at each end of said cage for threaded engagement in a pair of threaded openings formed in the pipe, one end of said cage being open and formed with internal threads, a bottom wall at the other end of said cage, said bottom wall having an axial internally threaded opening, a nozzle threaded into said latter opening, a valve plug rotatable in said cage having a transverse passage adapted in the open position of said plug to register with said cage openings, said plug also having a longitudinal opening communicating with said passage and with said nozzle, a cap threaded into said one end of said cage and having an axial bore, and a stem fixed to one end of said plug and rotatably engaging through said bore, the opposite end of said plug bearing against said bottom wall.

References Cited in the file of this patent

UNITED STATES PATENTS

| | | |
|---|---|---|
| 753,730 | Owen | Mar. 1, 1904 |
| 2,145,451 | McCoy | Jan. 31, 1939 |
| 2,439,539 | Cellwork | Apr. 13, 1948 |
| 2,605,140 | Bartling | July 29, 1952 |
| 2,657,092 | Jones | Oct. 27, 1953 |